J. R. REYBURN.
CLAMP FOR ATTACHING AUTOMOBILE BUFFERS.
APPLICATION FILED JAN. 29, 1921.
1,380,741.
Patented June 7, 1921.
2 SHEETS—SHEET 1.
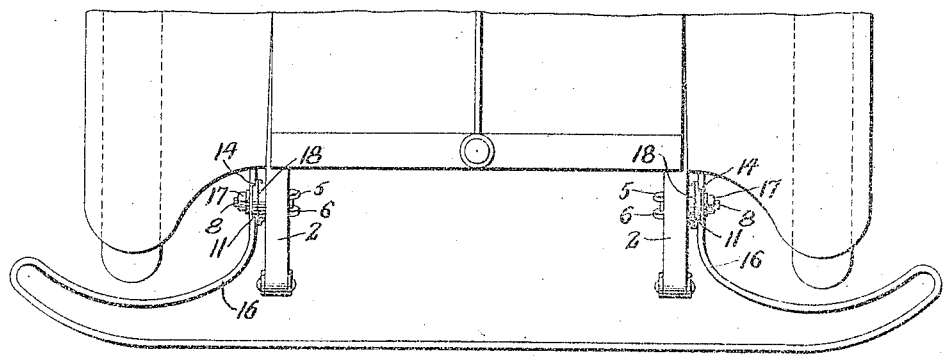
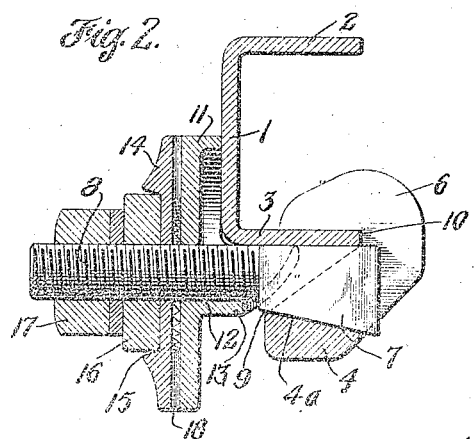
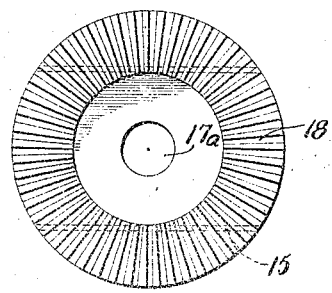
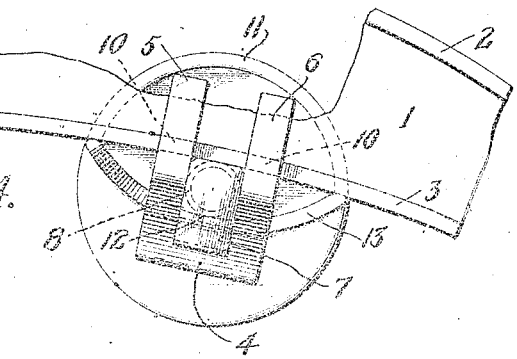
INVENTOR
John R. Reyburn
BY
Frederick S. Duncan
ATTORNEY J. R. REYBURN.
CLAMP FOR ATTACHING AUTOMOBILE BUFFERS.
APPLICATION FILED JAN. 29, 1921.

1,380,741.

Patented June 7, 1921.
2 SHEETS—SHEET 2.

John R. Reyburn INVENTOR
by
Frederick S. Duncan ATTORNEY

UNITED STATES PATENT OFFICE.

JOHN R. REYBURN, OF FAIRFIELD, CONNECTICUT, ASSIGNOR TO AMERICAN CHAIN COMPANY, INC., A CORPORATION OF NEW YORK.

CLAMP FOR ATTACHING AUTOMOBILE-BUFFERS.

1,380,741. Specification of Letters Patent. Patented June 7, 1921.

Application filed January 29, 1921. Serial No. 440,867.

*To all whom it may concern:*

Be it known that I, JOHN R. REYBURN, a citizen of the United States, residing at Fairfield, in the county of Fairfield, State of Connecticut, have invented certain new and useful Improvements in Clamps for Attaching Automobile-Buffers, of which the following, taken in connection with the accompanying drawings, is a specification.

My invention relates to automobile buffers, more particularly of the kind that are adaptable for use in attaching the supporting arms of buffers to the type of automobile frame which includes a pair of longitudinally disposed channel bars.

It has for its general object the construction of such an attachment as will maintain under all conditions likely to be encountered in practical use, a rigid, unyielding connection between the frame and the bumper.

Another object is the construction of an attachment for the above expressed purpose which will be characterized by a substantially parallel closing in motion of two coöperating clamping members as tension is exerted on one of them.

Another object is the construction of an attachment characterized as last described, in which the tension force exerted in clamping is multiplied in the clamping action.

Another object is the construction of an attachment composed of parts so proportioned and related as to make the device adaptable for a considerable range of adjustment.

Another object is to provide an attachment which may be used singly on each channel bar of the frame, and at the same time hold the buffer firmly and rigidly.

Another object is the construction of an attachment for the purposes described which, while maintaining a rigid connection with the frame, will, at the same time, permit the bumper arms to be adjusted to positions in different horizontal planes and to be securely held in any position to which they are adjusted.

Another object is to provide an attachment for the purposes above described which will not slip on the frame to which it is attached, accidentally during normal operation of an automobile or by force of impact on the bumper or otherwise.

Referring to the drawings:

Figure 1 is a plan view of the front portion of an automobile showing a bumper clamped to the frame by means of my device and also showing the ordinary radiator, front wheels and fenders.

Fig. 2 is a section of the line 2—2 of Fig. 6, looking in the direction of the arrows in the latter figure.

Fig. 3 is a face view of the member to which the buffer bar is clamped.

Fig. 4 is a detail view of my device shown attached to a portion of the channel bar.

Figure 5:
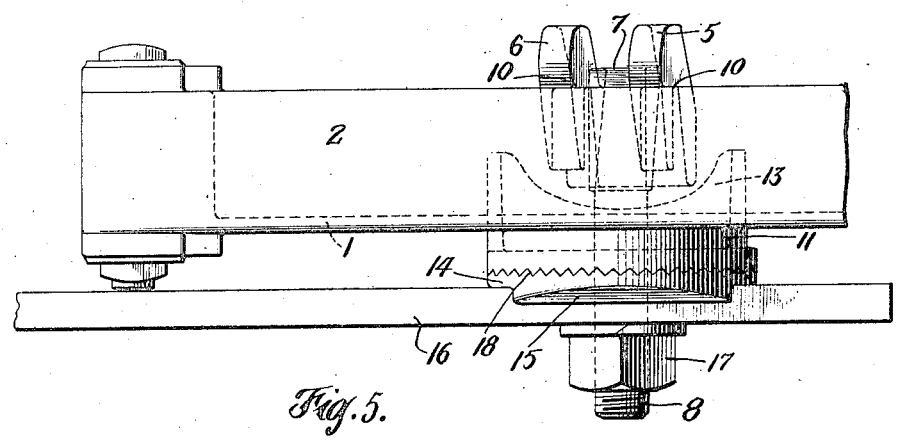
Fig. 5 is a plan view of my device showing a supporting arm of a buffer attached and also showing the device clamped to an automobile frame.
Figure 6:
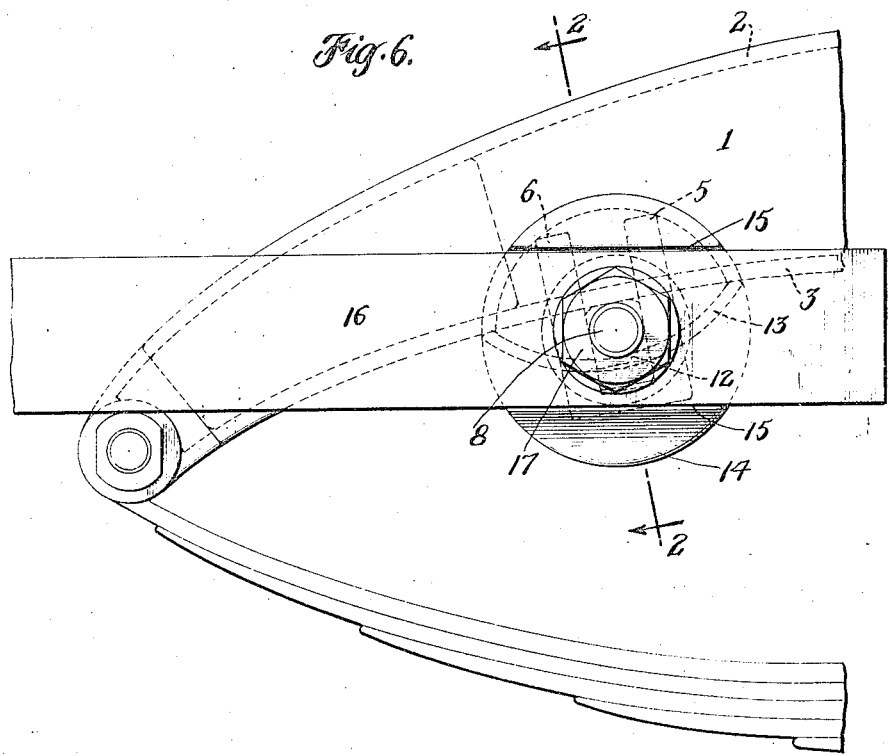
Fig. 6 is an elevation of the view shown in Fig. 5.

In the various figures I show a well-known type of automobile frame which includes a pair of channel bars each of which comprises what may be described as the web 1, the upper flange 2, and the lower flange 3. In the drawing showing the assemblage of the parts of my device with an automobile frame (Fig. 1), I have shown the device as clamped to the lower flange of the channel bar. This is done, however, merely for the reason that in nearly all types of present-day automobiles, the upper flange is not easily accessible by reason of the presence of splash-pans or fenders or both. It will be clear, however, that the device could, if desired, be attached to one flange as well as to the other and serve its purposes equally well in either situation.

The characteristic features of the frame clamping means are best shown in Fig. 2. A coupling or clamping member is provided comprising in the particular embodiment of my invention shown in the drawings a pair of hooks 5 and 6 united by a yoke 4 in such manner as to provide between them a wedging surface 4$^a$. In operation the bights of the hooks rest on the flange as shown in Fig. 2. Preferably the portions of the hooks which rest on the flange are straight and angularly disposed with respect to the wedging surface above referred to. It is pointed out that the particular construction of the hooks which I show is one that I have found especially suitable from a manufacturing viewpoint, and that I do not consider the characteristic of a plurality of hooks or inclined pitch of the wedging surface material to the full scope of my invention, the essential characteristic being that the hooks shall sustain a surface oppositely disposed with respect to the outer side of a flange which surface will wedgingly co-act with a wedge member, as will be hereinafter more fully described. In other words, the yoke portion 4 virtually constitutes a stirrup which is anchored to the flange by the hooks 5 and 6, and which serves as a support to limit the motion of the wedge member through the passage between the base and the flange and to cause it to lie firmly and closely against the flange when drawn to the limit of its motion. The clamping of the flange is effected by coöperation of the coupling with a wedge-shaped member 7 above referred to, which may, for convenience of manufacture, constitute a head on the bolt shank 8, the combination of shank 8 and member 7 being termed for convenience the bumper arm support. The wedge-shaped member or bolt head 7 acts between the lower side of the flange 3 and the wedging surface supported by the hooks, and it is obvious that as tension is exerted on the shank 8 the head 7 will wedge between the base 4 of the coupling and the flange 3 whereby the flange 3 will be securely clamped between the bolt head and the bights of the hooks. So long as the tension thus applied is maintained, the parts thus far described constitute a self-supporting combination adaptable for application to a flange of an automobile frame in such manner that there is substantially no lost motion as between the shank and the wedge-shaped head on the one hand and the frame of the automobile on the other.

The rigidity of the attachment may be somewhat augmented by the use of a bearing member through which the shank may pass and which offers a right angle surface to conform to the right angle formed by the web and flange 3 of the channel bar. This bearing member may suitably comprise a plate 11 shown in the drawings as disk-shaped and provided with an aperture 12 through which the shank may pass and also with a projecting lip 13, the lip 13 and the disk-shaped member forming the right angle surface referred to. It is obvious that as the plate 11 and the wedge-shaped member are drawn toward each other, additional support is given to the shank by reason of the absence of clearance between the plate 11 and the frame. It is preferable that the lip 13 be of sufficient breadth to contact with the flange 3 at points on either side of and remote from the bolt aperture. The bumper arm 16 may if desired be supported on the bumper arm support through the medium of a member 14 preferably provided with a channel 15 of suitable width to receive the bumper arm, and also with an aperture 17a through which the shank 8 may pass. Suitable means for firmly securing the combination of parts together are employed which may consist of the nut 17, and a lock washer, if desired, may be interposed between the nut and the bumper arm 16.

It is obvious that the bumper arm together with the member 14 may, particularly when the nut 17 is removed or loosened pivot on the shank 8 while the other parts remain substantially stationary, thus making it possible to raise and lower the bumper arm to various elevations. By tightening the nut, the plate 14 is clamped to the plate 11 and the bumper may be adjusted to remain permanently in any predetermined position within the limit of its motion. It is advisable, however, not to depend solely upon friction between the member 14 and the bearing plate 11 to maintain the adjustment. To firmly secure the bumper in adjusted position, I therefore prefer to provide the contacting surfaces of the plates with intermeshing radially disposed teeth 18, as is best shown in Fig. 3. The presence of these teeth makes it possible to positively adjust the bumper to a large range of angular positions within the limits of its swing.

Having thus described my invention and with the understanding that the changes, variations and modifications can be resorted to which nevertheless come within the scope thereof, I claim:

1. In an attaching clamp for automobile buffers, a single supporting member provided with a tapered portion and a coupling therefor adapted to engage the inner side of a flange of a channel bar and also to engage said tapered portion.

2. In an attaching clamp for automobile buffers, a one-piece supporting member provided with a tapered portion and a coupling therefor adapted to engage the inner side of a flange of a channel bar and also to engage said tapered portion.

3. In an attaching clamp for automobile buffers, a single supporting member consisting of a tapered portion provided with a stem and a coupling therefor adapted to engage a flange of a channel bar and also to engage the said tapered portion.

4. In an attaching clamp for automobile buffers, a shaft having a tapered portion rigidly secured thereto, and a coupling therefor adapted to engage the inner side of a flange of a channel bar and also to engage said tapered portion.

5. In an attaching clamp for automobile buffers, a shaft having a tapered portion, said tapered portion being arranged in end to end relation with the shaft, and a coupling therefor adapted to engage the flange of a channel bar and also to engage the said tapered portion.

6. In an attaching clamp for automobile buffers, a supporting member consisting of a single element, said element having a tapered portion, and a coupling therefor adapted to engage the flange of a channel bar and also to engage the said tapered portion.

7. In an attaching clamp for automobile buffers, a supporting member which includes a wedge-shaped portion, and a coupling adapted to engage the inner side of the flange of a channel bar and at the same time to wedgingly retain said wedge-shaped portion against the outer side of said flange when said supporting member is so positioned that the taper of said wedge-shaped portion extends from the outer to the inner edge of said flange.

8. In a clamp for attaching buffers to channel bars of automobile frames, a supporting member having a tapered portion decreasing in thickness toward the web of the channel bar when the said member is applied to a flange of said channel bar and a coupling therefor adapted to engage the said flange of the channel bar and also to engage the said tapered portion.

9. In an attaching clamp for automobile buffers, a buffer arm supporting member comprising a wedge-shaped portion provided with a threaded shank, a stirrup adapted to engage the inner side of the flange of a channel bar and to wedgingly retain said supporting member by embracing said wedge shaped portion, and means for drawing said supporting member and said stirrup into clamping relation with said flange.

10. In an attaching clamp for automobile buffers, a buffer arm supporting member comprising a wedge-shaped portion provided with a shank, the wedge tapering in the direction of said shank, a stirrup adapted to be supported from the inner side of a flange of a channel bar and to wedgingly retain said supporting member by embracing said wedge-shaped portion, a plate provided with an aperture having a sliding fit on said shank, and also with a lip forming a right angle surface with respect to a face of said plate, and means for drawing said supporting member through said stirrup and also said plate into clamping relation with said flange.

11. In an attaching clamp for automobile buffers, a buffer arm supporting member comprising a wedge-shaped portion provided with a shank, the wedge tapering in the direction of said shank, a stirrup adapted to be supported from the inner side of a flange of a channel bar and to wedgingly retain said supporting member by embracing said wedge-shaped portion, a plate provided with an aperture having a sliding fit on said shank, and also with a lip forming a right angle surface with respect to a face of said plate, means for drawing said supporting member through said stirrup and also said plate into clamping relation with said flange, said means also serving to draw a bumper arm into clamped relation with said plate.

12. In an attaching clamp for automobiles, a coupling member including a hook provided with a straight bight adapted to lie adjacent the inner side of a flange of a channel bar and a wedging surface supported by said hook, said wedging surface and said bight being converging, a buffer arm support consisting of a wedge-shaped portion provided with a shank, said wedge-shaped portion being adapted to wedgingly fit between said wedging surface and said flange when the parts are adjusted to a channel bar, and means operating on said shank for drawing the wedge-shaped portion into wedging engagement with said wedging surface and said flange.

13. In an attaching clamp for automobiles, a coupling member including a pair of hooks provided with straight bights adapted to engage the inner side of a flange of a channel bar and a wedging surface supported by and between said hooks, said wedging surface and the plane of said bights being converging, a buffer arm support consisting of a wedge-shaped portion provided with a shank, said wedge-shaped portion being adapted to wedgingly fit between said wedging surface and said flange when the parts are adjusted to a channel bar, and a nut on said shank for drawing the wedge-shaped portion into wedging engagement with said wedging surface and said flange.

14. In an attaching clamp for automobiles, a coupling member including a hook provided with a virtually straight bight adapted to engage the inner side of a flange of a channel bar and a wedging surface supported by said hook, said wedging surface and said bight being converging, a buffer arm support consisting of a wedge-shaped portion provided with a shank, a bearing plate presenting a right angle surface adapted to inclose an angle of said channel bar and provided with an aperture whereby it is adapted to slidingly fit on said shank, a second plate also provided with an aperture whereby it is adapted to slidingly fit on said shank and to lie adjacent the bearing plate, and means operating on said shank for drawing the parts together into clamping relation with a flange and a bumper arm.

15. In an attaching clamp for automobile buffers, a buffer arm support having a wedge-shaped portion, a coupling having a hook portion adapted to engage the inner side of a flange of a channel bar and also a portion adapted to embrace the said wedge-shaped portion when the same is positioned adjacent to the outer side of said flange and transversely thereof, a bearing plate carried by said support and presenting a right angle surface adapted to conform to an angle of said channel bar, a second plate carried by said support and adapted to lie against the first, said second plate being provided with a transverse groove to receive a bumper arm, and means for forcing said support wedgingly between said coupling and said flange and at the same time drawing the said plates together.

16. An attaching device for automobile buffers comprising a buffer arm support consisting of a bolt provided with a wedge-shaped head and a threaded shank, a coupling adapted to engage the inner side of a flange of a channel bar and to embrace said head when the said bolt is adjacent to the outer side of said flange, a bearing plate provided with an aperture through which said shank may pass and also with an anti-slipping face, a lip projecting from the opposite face of said plate and presenting a surface at right angles to said opposite face, and a second plate also provided with a similar aperture, one face of said plate being adapted to engage said anti-slipping face and the opposite face being provided with a transverse groove adapted to receive a bumper arm.

17. An attaching device for automobile buffers comprising a buffer arm support consisting of a bolt provided with a wedge-shaped head and a threaded shank, a coupling adapted to engage the inner side of a flange of a channel bar and to embrace said head when the said bolt is adjacent to the outer side of said flange, a bearing plate provided with an aperture through which said shank may pass and also with an anti-slipping face, a lip projecting from the opposite face of said plate and presenting a surface at right angles to said opposite face, and a second plate also provided with a similar aperture, one face of said plate being adapted to engage said anti-slipping face and the opposite face being provided with a transverse groove adapted to receive a bumper arm, and a nut on said shank for drawing the parts together into clamping relation with a bumper arm and a flange of a channel bar.

18. In an attaching clamp for automobile buffers, a buffer arm support having a wedge-shaped portion adapted to be positioned transversely against the outer side of a flange in an automobile frame, a coupling adapted to engage the inner side of said flange and to embrace said wedge-shaped portion when thus positioned, a bearing plate carried by said support and presenting a right angle surface to fit an angle of a channel bar, and means for rotatably mounting a buffer arm on said support.

19. In an attaching clamp for automobile buffers, a coupling provided with a hook end adapted to engage the inner side of a flange of a channel bar with a wedging surface supported by said hook and adapted when thus supported to be positioned in opposed relation to the outer side of said flange, a bearing plate presenting a right angle surface adapted to be adjusted to the angle of said channel bar adjustment to said flange, and a wedge member adapted to wedgingly fit between said wedging surface and the said outer side of said flange, said wedge member terminating in a shank adapted to be connected with said bearing plate, and means operating on said shank for drawing said coupling and said bearing plate into clamping relation with each other on said channel bar.

20. In an attaching clamp for automobile buffers, a coupling provided with a hook end adapted to engage the inner side of a flange of a channel bar with a wedging surface supported by said hook and opposed to the outer side of said flange and spaced therefrom where the said hook is thus engaged, a bumper arm support comprising a wedge member and a shank therefor, said wedge member being adapted to wedgingly fit between said flange and said wedging surface, and said shank being adapted to lie transversely of said flange and extend beyond the angle of said channel bar when said wedging member is in such wedging relation, a bearing plate adapted to receive the projecting end of said shank and means operating on said shank for drawing the above mentioned parts into clamping relation with each other on a channel bar.

21. In an attaching clamp for automobile buffers, a coupling provided with a hook end adapted to engage the inner side of a flange of a channel bar with a wedging surface supported by said hook and opposed to the outer side of said flange and spaced therefrom where the said hook is thus engaged, a bumper arm support comprising a wedge member and a shank therefor, said wedge member being adapted to wedgingly fit between said flange and said wedging surface, and said shank being adapted to lie transversely of said flange and extend beyond the angle of said channel bar when said wedging member is in such wedging relation, a bearing plate adapted to receive a bumper arm retaining member adapted to be rotatably mounted on said shank and in frictional contact with said bearing plate and means operating on said shank for drawing the above mentioned parts into clamping relation with each other on a channel bar.

22. In a clamp for attaching automobile buffers, a wedge-shaped member adapted to be positioned against the outer side of a flange of a channel bar, a coupling member adapted to engage the inner side of said flange and also said wedge-shaped member, a shaft connected with one of said members, a bearing plate adapted to be positioned against the web of said channel bar and through which said shaft is adapted to pass, a buffer arm retaining member pivotally mounted on said shaft and adapted to be positioned in contact with said bearing member and means for drawing said shaft through said bearing member and said buffer arm retaining member and at the same time forcing said wedge-shaped member into wedging engagement between said coupling and said flange.

23. In an attaching clamp for automobile buffers, a bearing plate adapted to be positioned against the outer surface of the web of a channel bar, a buffer arm retaining member adapted to be positioned in contact with said bearing member, a shaft passing through both said members, and on which said buffer arm retaining member is pivotally mounted, said shaft having a threaded end and projecting beyond said retaining member, a wedge-shaped member connected to said shaft and adapted to be positioned against the outer side of a flange of said channel bar, a coupling adapted to engage the inner side of said flange and also said wedge-shaped member, and a nut on said threaded end for forcing said coupling and said wedge-shaped member into wedging relation with said flange.

24. In a clamp for attaching automobile buffers, a bearing plate adapted to be positioned against the outer surface of the web of a channel bar, a buffer arm retaining member adapted to be positioned in contact with said bearing plate, the contacting surfaces of said plate and said member being serrated and mating, a shaft passing through said member and said plate, a stirrup adapted to be supported by engagement with the inner surface of a flange of said channel bar, a wedge-shaped member engaged by said stirrup, said wedge-shaped member being adapted to be positioned against the outer side of said flange and transversely thereof, and means operating on said shaft for forcing said wedge-shaped member into wedging engagement between said stirrup and said flange.

25. In a clamp for attaching automobile buffers, a shaft, a bearing plate on said shaft adapted to contact with the web of a channel bar, means carried by said shaft for adjustably attaching a buffer bar thereto, a wedge-shaped member adapted to be positioned against the outer side of a flange of said channel bar, a coupling adapted to engage the inner side of said flange and also said wedge-shaped member and means for forcing said bearing plate against said web and also said wedge-shaped member and said coupling into wedging engagement with said flange.

In testimony whereof, I have signed this specification.

JOHN R. REYBURN.